United States Patent
Kataoka

(10) Patent No.: US 8,885,456 B2
(45) Date of Patent: Nov. 11, 2014

(54) DEMODULATOR AND FRAME SYNCHRONIZATION METHOD

(75) Inventor: Nobuhisa Kataoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1011 days.

(21) Appl. No.: 12/500,922

(22) Filed: Jul. 10, 2009

(65) Prior Publication Data

US 2011/0007625 A1   Jan. 13, 2011

(51) Int. Cl.
*H04L 27/26* (2006.01)

(52) U.S. Cl.
CPC ........ *H04L 27/2656* (2013.01); *H04L 27/2657* (2013.01)
USPC .......................................... 370/208

(58) Field of Classification Search
CPC ................. H04L 27/2656; H04L 27/2657
USPC .......................................... 370/208
See application file for complete search history.

(56) References Cited

U.S. PATENT DOCUMENTS

| | | | | |
|---|---|---|---|---|
| 2001/0036235 A1* | 11/2001 | Kadous | ........................... | 375/341 |
| 2002/0034161 A1* | 3/2002 | Deneire et al. | ................. | 370/210 |
| 2005/0047429 A1* | 3/2005 | Koo et al. | ...................... | 370/447 |
| 2005/0063298 A1* | 3/2005 | Ling et al. | ...................... | 370/208 |

FOREIGN PATENT DOCUMENTS

| | | |
|---|---|---|
| JP | 2000-151545 | 5/2000 |
| JP | 2001-285248 | 10/2001 |
| JP | 2002-135227 | 5/2002 |
| JP | 2004-222207 | 8/2004 |
| JP | 2006-94150 | 4/2006 |

OTHER PUBLICATIONS

Japanese Office Action mailed on Aug. 16, 2011 in the counterpart Japanese application 2007-044371 filed on February 23, 2007 with partial English translation.

* cited by examiner

*Primary Examiner* — Jason Mattis
*Assistant Examiner* — Stephen J Clawson
(74) *Attorney, Agent, or Firm* — Oblon, Spivak, McClelland, Maier & Neustadt, L.L.P.

(57) ABSTRACT

A clock-frequency-deviation detecting unit detects a clock-frequency deviation based on a synchronization signal for taking a frame synchronization included in a reception signal. A clock-frequency-deviation compensating unit compensates a clock-frequency deviation of the reception signal in a former stage of an FFT unit. A timing control unit controls a frame pulse position indicating a head of a frame, based on the synchronization signal. The FFT unit performs an FFT on the reception signal with the frame pulse position as a frame head position, and a demodulating unit demodulates an output of the FFT unit.

16 Claims, 10 Drawing Sheets

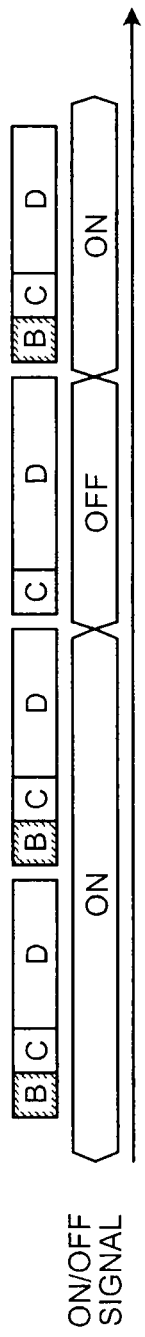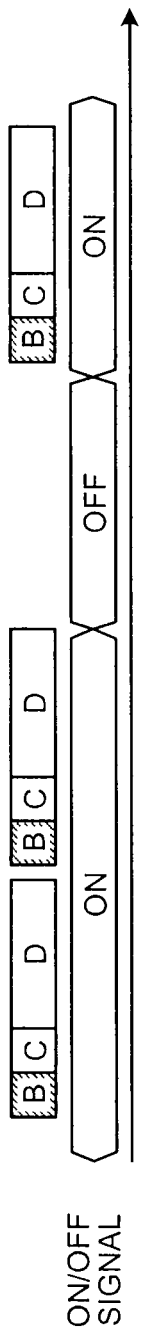

DEMODULATOR AND FRAME SYNCHRONIZATION METHOD

BACKGROUND OF THE INVENTION

1. Field of the Invention

The present invention relates to a demodulator for a communication system employing an orthogonal frequency division multiplexing (OFDM) scheme, and more particularly, to a demodulator and a frame synchronization method for a communication system in which a communication is performed by an OFDM scheme using a time division multiple access (TDMA).

2. Description of the Related Art

In recent years, an orthogonal frequency division multiplexing (OFDM) communication system has been a focus of constant attention in a wireless communication system for its capability in a multipath environment and high frequency-use efficiency. Meanwhile, a time division multiple access (TDMA) communication system has better communication efficiency than a carrier sense multiple access (CSMA) that has been used in the conventional wireless local area network (LAN) because it accommodates user data in a frame without collisions of data. For this reason, an OFDM communication system using the TDMA has recently been commonly used instead of an OFDM communication system using the CSMA.

In the OFDM communication system using the TDMA, it is necessary to generate a frame pulse that indicates a head position of a reception frame at a receiver side. The frame pulse is a synchronization signal required for correctly demodulating an OFDM signal, which becomes a timing signal (FFT timing signal) for executing a fast Fourier transform (FFT). Therefore, in order to perform a demodulation in a correct manner, it is required to generate the frame pulse at just the right timing (right FFT timing). There are several methods to detect the right FFT timing; for example, a method of detecting the right FFT timing with an improved detection accuracy is disclosed in Japanese Patent Application Laid-open No. 2004-222207.

Furthermore, because there is a difference in the oscillation frequency between a clock oscillator of a transmitter and a clock oscillator of a receiver, the receiver in the OFDM communication system using the TDMA is required to have a clock-frequency synchronization function (a function of compensating a clock-frequency deviation). In other words, the receiver is required to have two synchronization functions including a function of generating the frame pulse (an FFT-timing synchronization function) and the clock-frequency synchronization function.

If the clock-frequency deviation is large, the orthogonality cannot be maintained between subcarriers of the OFDM, and as a result, the quality of demodulated data is degraded. Therefore, a standard has set a usage of a high-accuracy clock oscillator, without a necessity of considering an influence of the clock-frequency deviation because is ignorable. In short, the conventional communication system only requires the FFT-timing synchronization function as the synchronization function without putting a particular consideration about the clock-frequency deviation (see, for example, Japanese Patent Application Laid-open No. 2004-222207).

The accuracy level required in a clock oscillator increases as the FFT data size increases. With a background of a demand in high speed against the recent wireless communication, the FFT data size tends to increase compared to the conventional wireless LAN, which requires a clock oscillator with a higher accuracy. However, the high-accuracy clock oscillator is expensive so that it increases the cost of a whole apparatus. In order to avoid a cost rise, it is necessary to employ a cheap and low-accuracy clock oscillator, although in this case, a clock-frequency deviation is possibly generated which is not ignorable (sufficiently large).

However, the conventional receiver has no synchronization function considering a large clock-frequency deviation. As a result, if there is a large clock-frequency deviation, the frame synchronization function cannot establish a correct synchronization or a following performance after a synchronization is degraded, which is problematic.

SUMMARY OF THE INVENTION

It is an object of the present invention to at least partially solve the problems in the conventional technology.

According to one aspect of the present invention, there is provided a demodulator that includes a fast Fourier transform (FFT) unit and a demodulating unit and performs an orthogonal frequency division multiplexing demodulation. The demodulator further includes a clock-frequency-deviation detecting unit that detects a clock-frequency deviation based on a synchronization signal for taking a frame synchronization included in a reception signal; a clock-frequency-deviation compensating unit that compensates a clock-frequency deviation of the reception signal in a former stage of the FFT unit; and a timing control unit that controls a frame pulse position that indicates a head of a frame, based on the synchronization signal. The FFT unit performs an FFT on the reception signal that is compensated by the clock-frequency-deviation compensating unit with the frame pulse position as a frame head position, and the demodulating unit demodulates the signal on which the FFT is performed.

Furthermore, according to another aspect of the present invention, there is provided a demodulator that includes an FFT unit and a demodulating unit and performs an orthogonal frequency division multiplexing demodulation. The demodulator further includes a timing control unit that obtains a clock-frequency deviation based on a synchronization signal for taking a frame synchronization included in a reception signal, and generates a frame pulse that indicates a head of a frame at a fixed position; and a clock-frequency-deviation compensating unit that compensates a clock-frequency deviation of the reception signal in a former stage of the FFT unit. The FFT unit performs an FFT on the reception signal that is compensated by the clock-frequency-deviation compensating unit with the frame pulse position as a frame head position, and the demodulating unit demodulates the signal on which the FFT is performed.

Moreover, according to still another aspect of the present invention, there is provided a frame synchronization method in a demodulator that performs an orthogonal frequency division multiplexing demodulation. The frame synchronization method includes detecting a clock-frequency deviation based on a synchronization signal for taking a frame synchronization included in a reception signal; compensating a clock-frequency deviation of the reception signal in a former stage of an FFT; and controlling a frame pulse position that indicates a head of a frame, based on the synchronization signal. The frame synchronization method further includes performing the FFT on the reception signal that is compensated at the compensating with the frame pulse position as a frame head position; and demodulating the signal on which the FFT is performed.

Furthermore, according to still another aspect of the present invention, there is provided a frame synchronization method in a demodulator that performs an orthogonal frequency division multiplexing demodulation. The frame synchronization method includes controlling including obtaining a clock-frequency deviation based on a synchronization signal for taking a frame synchronization included in a reception signal, and generating a frame pulse that indicates a head of a frame at a fixed position; and compensating a clock-frequency deviation of the reception signal in a former stage of a fast Fourier transform (FFT). The frame synchronization method further includes performing the FFT on the reception signal that is compensated at the compensating with the frame pulse position as a frame head position; and demodulating the signal on which the FFT is performed.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 10A and 10B are schematic diagrams for explaining an ON/OFF signal;

DETAILED DESCRIPTION OF THE PREFERRED EMBODIMENTS

Exemplary embodiments of a demodulator according to the present invention will be explained in detail below with reference to the accompanying drawings. However, the present invention is not to be construed limited to the embodiments.

Figure 1:
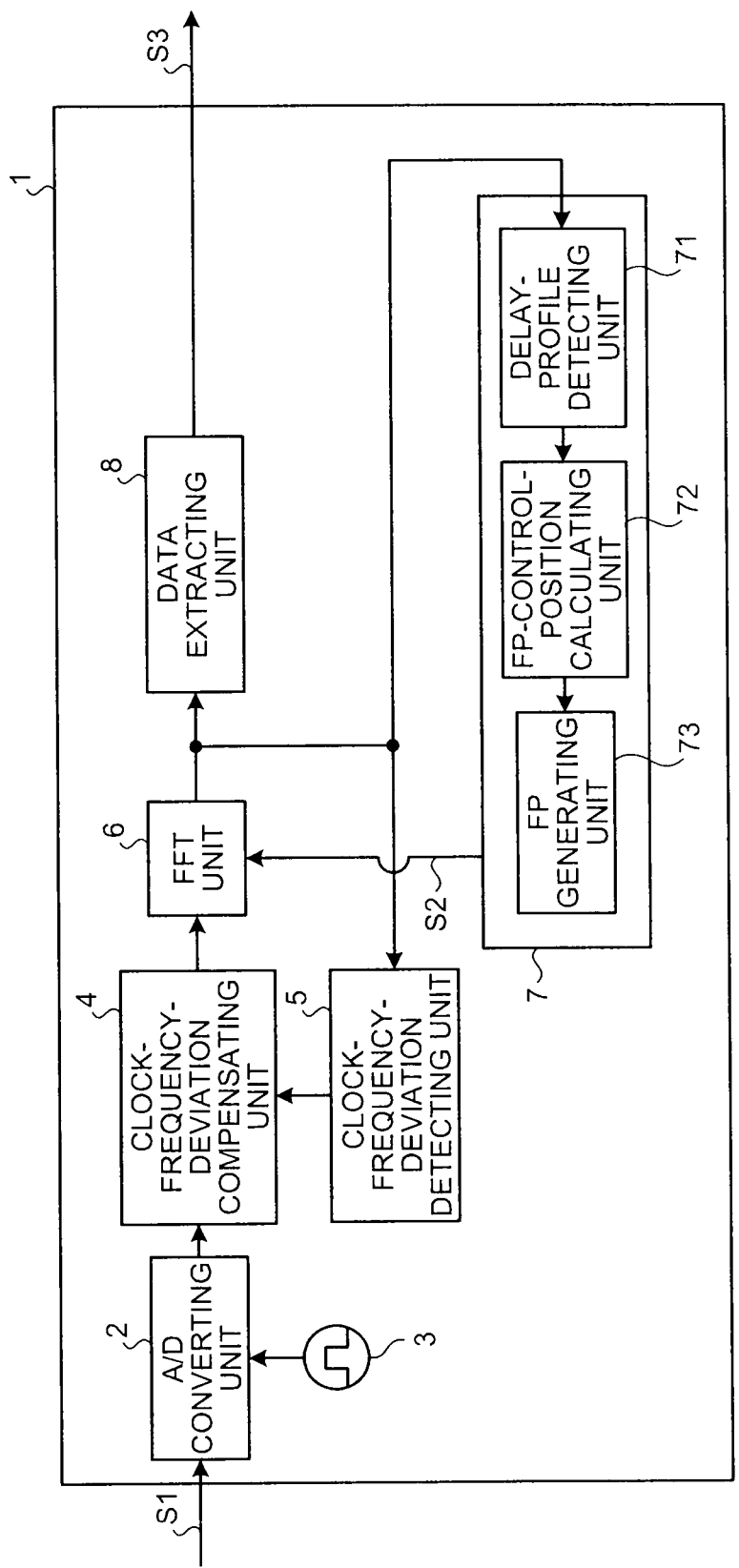
FIG. 1 is a functional block diagram of a demodulator according to a first embodiment of the present invention.

FIG. 1 is a functional block diagram of a demodulator 1 according to a first embodiment of the present invention. As shown in FIG. 1, the demodulator 1 according to the first embodiment includes an analog-to-digital (A/D) converting unit 2, a clock oscillator 3, a clock-frequency-deviation compensating unit 4, a clock-frequency-deviation detecting unit 5, an FFT unit 6, a timing generator (TG) 7, and a data extracting unit 8. The A/D converting unit 2 converts an input reception signal S1 into a digital signal; the clock oscillator 3 generates a clock; the clock-frequency-deviation compensating unit 4 compensates a clock-frequency deviation for the digital signal; the clock-frequency-deviation detecting unit 5 detects the clock-frequency deviation with a communication partner; the FFT unit 6 performs an FFT on the digital signal after compensating the clock-frequency deviation; the TG 7 generates a frame pulse S2 in which a timing error is compensated; and the data extracting unit 8 demodulates a signal after the FFT by a synchronized detection or a delayed detection to obtain demodulated data S3.

The TG 7 includes a delay-profile detecting unit 71 that detects a delay profile, a frame pulse (FP)-control-position calculating unit 72, and a frame pulse (FP) generating unit 73. The reception signal S1 is an analog signal input to the demodulator 1; for example, in the case of a wireless communication, it is a signal obtained by performing a process of amplification or filtering by an analog circuit on a signal received by an antenna. In the case of a power line communication (PLC), the reception signal S1 is a signal obtained by performing a process of amplification or filtering by an analog circuit on a signal transmitted through a power line. The frame pulse S2 is a timing signal for controlling a timing of the FFT. The demodulated data S3 is demodulated data on which a process is performed by the demodulator 1, and is output to the outside (such as a user apparatus that uses the data).

Figure 2:
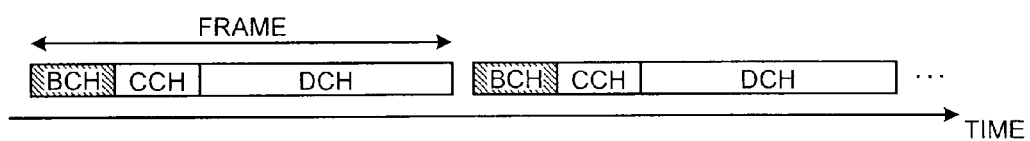
FIG. 2 is a schematic diagram illustrating an example of a TDMA frame format.

In the first embodiment, the reception signal S1 is an orthogonal frequency division multiplexing (OFDM) signal employing a time division multiple access (TDMA) frame format. FIG. 2 is a schematic diagram illustrating an example of the TDMA frame format according to the first embodiment. As shown in FIG. 2, a frame according to the first embodiment in the TDMA includes a broadcast information channel (BCH), a control channel (CCH), and a data channel (DCH). The BCH is arranged at the head of the frame, and informs a station number of a transmission station and the like; the CCH informs a channel allocated to a user (such as a timeslot number used); and the DCH is used for each user to perform an information transmission.

A frame synchronization in the first embodiment means a function of receiving a signal of the format shown in FIG. 2 and outputting a frame pulse accurately at the head position of the frame (a position of the BCH). Then, the demodulator 1 according to the first embodiment performs an FFT process based on a timing of a generated frame pulse and a data extraction. In the BCH, an OFDM signal of a known sequence, which is called a preamble (not shown), is attached for taking a synchronization. Although a preamble is attached to the CCH or the DCH in some cases, the preamble attached to the BCH is composed out of a known sequence that is different from known sequences of the CCH and the DCH, and normally, it can be identified. Therefore, in the first embodiment, a preamble signal attached to the BCH is observed, and a communication is performed by continuously maintaining a frame synchronization by following a reception timing of the preamble signal.

When the reception signal S1 is input to the demodulator 1, the A/D converting unit 2 converts the reception signal S1 into a digital signal based on the clock generated by the clock oscillator 3, and outputs the digital signal to the clock-frequency-deviation compensating unit 4. The clock-frequency-deviation compensating unit 4 performs a compensation of a frequency deviation including a clock-frequency deviation on the digital signal. There are two types of frequency deviations including a frequency deviation due to a speed of an A/D conversion (hereinafter, "a sampling-frequency deviation") and a clock-frequency deviation with a communication partner (hereinafter, "a clock-frequency deviation"). The clock-frequency-deviation compensating unit 4 estimates a clock frequency of the communication partner (transmission side) based on the sampling-frequency deviation and the clock-frequency deviation, and converts a frequency of the digital signal into the estimated frequency. Therefore, the clock-frequency-deviation compensating unit 4 is a sample-speed converting unit by a digital circuit, which can be constructed by, for example, sequentially shifting a tap coefficient of a finite impulse response (FIR) filter.

A frequency of the A/D conversion is same as a frequency (fixed frequency) of the clock oscillator 3. The fixed frequency needs to be equal to or higher than a frequency that satisfies the sampling theorem, and generally, it is obtained by adding a constant frequency to the frequency that satisfies the sampling theorem. The constant frequency is the sampling-frequency deviation, and because it is a known value, it can be set in advance as a fixed value. On the other hand, regarding the clock-frequency deviation in transmission and reception, it is an unknown value so that it cannot be set in advance. For the clock-frequency deviation in transmission and reception, a value obtained by a clock-frequency-deviation detecting process by the clock-frequency-deviation detecting unit 5 is used, which will be described later. Performing a compensation of the two frequency deviations on the frequency of the digital signal obtained from the A/D conversion, it is possible to obtain an estimated value of the clock frequency of the communication partner (transmission side).

The FFT unit 6 recognizes the head of the frame based on the frame pulse S2 input from the TG 7, performs an FFT on the signal on which the clock-frequency-deviation compensation is performed by the clock-frequency-deviation compensating unit 4, and outputs a result of the FFT to the data extracting unit 8. The data extracting unit 8 demodulates the signal after the FFT, and outputs the demodulated data S3 to the outside. A general method can be used for demodulating the data, such as the synchronized detection or a delayed detection.

The clock-frequency-deviation detecting process in the clock-frequency-deviation detecting unit 5 according to the first embodiment will be explained. In the first embodiment, the clock-frequency deviation is detected based on the signal after the FFT. When there is a clock-frequency deviation, it appears as a phase shift amount that is different for each subcarrier after the FFT, which is an output of the FFT unit 6. Therefore, the clock-frequency deviation can be detected from the difference in the phase shift amount for each subcarrier.

The detection of the clock-frequency deviation can be performed before the FFT by applying a repetitive temporal waveform (a waveform in which the same waveform is repeated for every specified time) or a known temporal waveform, if exists, to the reception signal S1. In this case, in order to perform the detection of the clock-frequency deviation before the FFT with a high accuracy, a correlator is required for the temporal waveform. When the circuit size is large, and particularly when the number of FFT points is large, the correlator causes the circuit size to increase in a considerable amount, resulting in an increase of the size of the whole demodulator. To cope with this problem, the first embodiment does not necessitate the correlator having a large circuit size by using the signal after the FFT. In addition, because the clock-frequency deviation is compensated before the FFT process, even if there is a large clock-frequency deviation, the orthogonality is maintained in the FFT process.

In the case where a signal used for compensating the clock-frequency deviation is embedded in a specific position within a frame, a timing at which the signal is received can be detected by observing a signal pattern after the FFT. Therefore, the clock-frequency-deviation detecting unit 5 and the clock-frequency-deviation compensating unit 4 can be operated only before and after the detection timing (timeslot obtained by adding a predetermined time to the detection timing). Furthermore, if a closed-loop gain (loop bandwidth) is set appropriately to capture the clock-frequency deviation with a closed loop, even if the accuracy of the detection timing at this time is coarse, an influence of its error is small enough, which does not cause any problem.

A frame synchronization process according to the first embodiment (a method of generating the frame pulse S2) will be explained. The clock-frequency-deviation compensating process described above is mainly for eliminating a large clock-frequency deviation, and therefore, it is necessary to perform a frame synchronization process for each frame, which is a fine adjustment of the clock-frequency deviation. For example, the frame synchronization process can be performed for each frame, and the clock-frequency-deviation compensating process can be performed at an initial time and at a time at which the clock-frequency deviation is anticipated to increase. Alternatively, both the clock-frequency-deviation compensating process and the frame synchronization process can also be performed for each frame.

Figure 3:
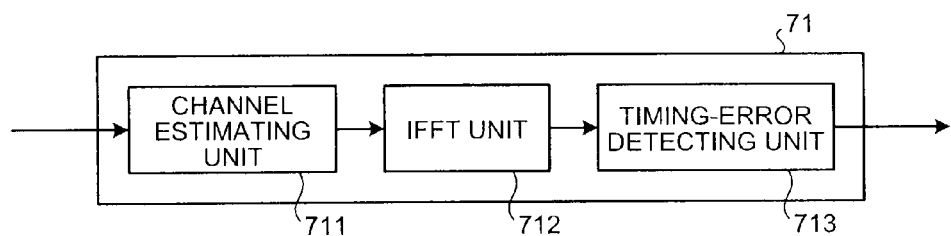
FIG. 3 is a functional block diagram of a delay-profile detecting unit shown in FIG. 1.

The delay-profile detecting unit 71 of the TG 7 generates a timing-error signal, which represents a timing error, by using the signal after the FFT output from the FFT unit 6. FIG. 3 is a functional block diagram of the delay-profile detecting unit 71. As shown in FIG. 3, the delay-profile detecting unit 71 includes a channel estimating unit 711, an inverse FFT (IFFT) unit 712, and a timing-error detecting unit 713.

The channel estimating unit 711 of the delay-profile detecting unit 71 creates a channel estimation value based on a signal after the FFT of a known signal for a frame synchronization (such as a preamble) included in the reception signal. The channel estimation is a function necessary when performing a synchronized detection in a demodulation in a modulation system using a phase, such as the quadrature phase shift keying (QPSK) and the quadrature amplitude modulation (QAM). Therefore, it does not need to be prepared for the delay-profile detecting unit 71 only, and because a synchronized detection circuit of the data extracting unit 8 can be shared, an increase of the whole circuit size can be prevented.

Figure 4A:
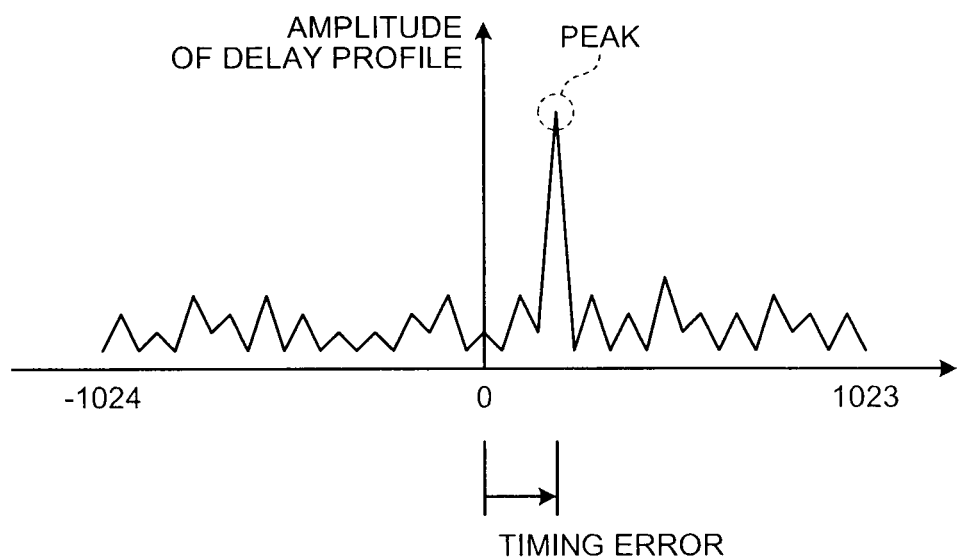
FIGS. 4A and 4B are diagrams showing examples of a delay profile.
Figure 4B:
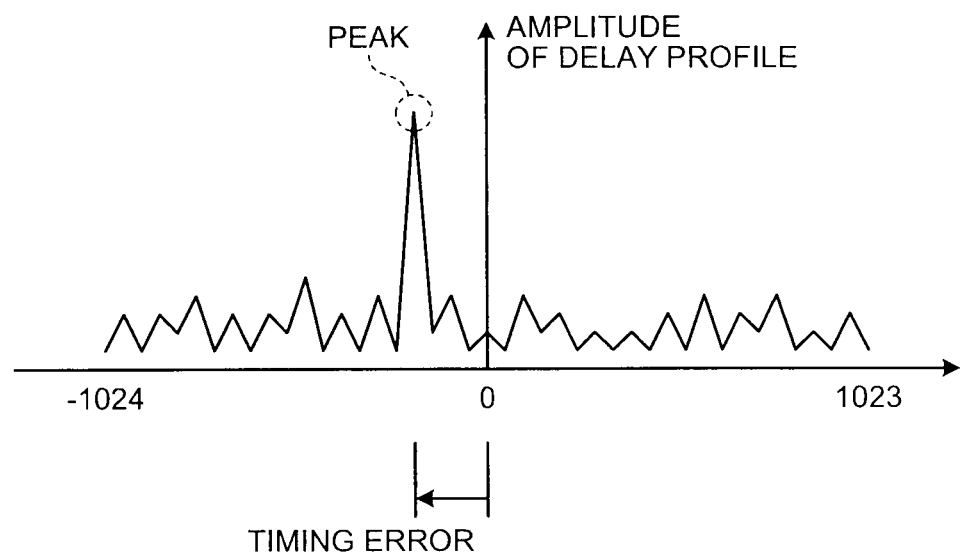

The IFFT unit 712 creates a delay profile by performing an IFFT on the channel estimation value. FIGS. 4A and 4B are diagrams showing examples of the delay profile. The delay profile becomes a signal having a sharp peak at a time 0 if a timing of generating a frame pulse is identical to a correct FFT timing (a timing to be a start point of the FFT). If the timings are not identical to each other, the peak appears at a point deviated from the time 0 by its error amount. In other words, a difference between the time 0 and the position of the peak is a timing error of generating the frame pulse. The timing-error detecting unit 713 detects the difference between the time 0 and the position of the peak, and outputs a timing-error signal indicating the timing error of generating the frame pulse.

For example, the example shown in FIG. 4A shows a case in which the timing of generating the frame pulse is ahead of a correct timing, where the peak appears on a positive side of the time 0. A distance from the position of the peak to the time 0 represents how early the timing of generating the frame pulse is. On the other hand, the example shown in FIG. 4B shows a case in which the timing of generating the frame pulse is behind the correct timing, where the peak appears on a negative side of the time 0.

The timing-error signal is generated based on the delay profile because the timing-error signal can be generated more accurately by using a known signal for a synchronization than by using a reception signal including unknown information.

Figure 5:
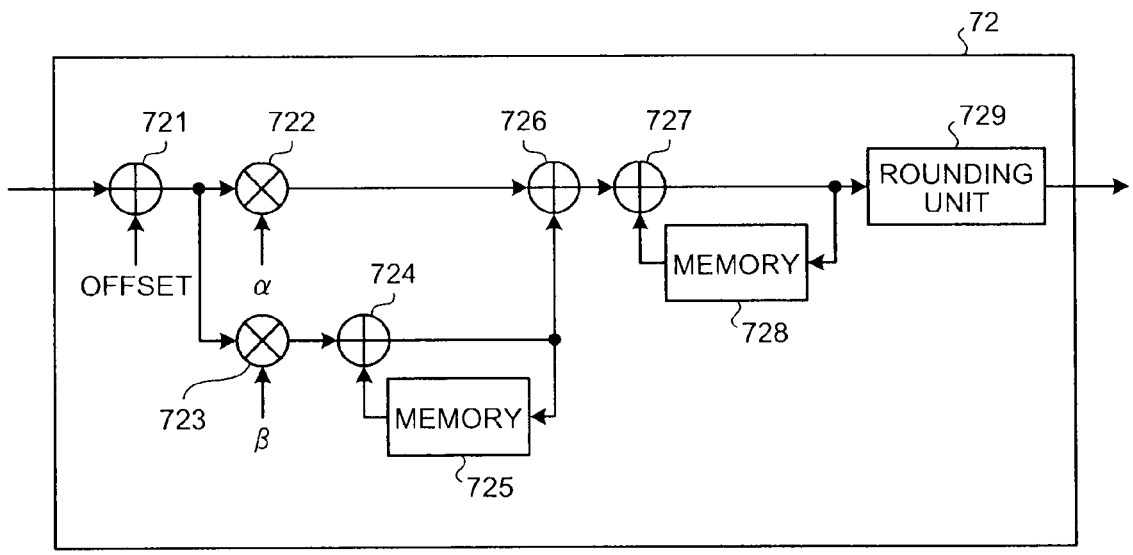
FIG. 5 is a functional block diagram of an FP-control-position calculating unit shown in FIG. 1.

The FP-control-position calculating unit 72 calculates an output timing of a frame pulse to be output for the next frame, based on the timing-error signal generated by the delay-profile detecting unit 71. FIG. 5 is a functional block diagram of the FP-control-position calculating unit 72. As shown in FIG. 5, the FP-control-position calculating unit 72 includes an adder 721, a multiplier 722, a multiplier 723, an adder 724, a memory 725, an adder 726, an adder 727, a memory 728, and a rounding unit 729. An operation of the FP-control-position calculating unit 72 will be explained.

The adder 721 adds an offset value to an input timing-error signal. An effect of adding the offset value to the timing-error signal will be explained later. The adder 721 outputs a result of the addition to the multiplier 722 and the multiplier 723. The multiplier 722 multiplies the output of the adder 721 by a coefficient $\alpha$ and outputs a result of the multiplication to the adder 726, and the multiplier 723 multiplies the output of the adder 721 by a coefficient $\beta$ and outputs a result of the multiplication to the adder 724, where $0 \leq \alpha \leq 1$ and $0 \leq \beta \leq 1$. Therefore, values obtained by multiplying the coefficients $\alpha$ and $\beta$ become real-numbered values, for example, 0.1, 1.23, and the like. The adder 724 adds data stored in the memory 725 (a result of an addition for the last frame) to the result of the multiplication output from the multiplier 723. Then, the adder 724 stores a result of the addition in the memory 725, and at the same time, outputs the result to the adder 726. The result stored in the memory 725 is maintained until a process of the next frame, and is used for the addition in the adder 724 for the process of the next frame.

The adder 726 adds the output of the adder 724 to the output of the multiplier 722, and outputs a result of the addition to the adder 727. The coefficients $\alpha$ and $\beta$ are corresponding to the first-order and the second-order feedback coefficients, respectively, and a loop configured in this manner becomes a second-order control system (when $\beta=0$, it operates as a first-order loop). The coefficient $\alpha$ is mainly used for suppressing a fluctuation of an input due to a noise, and the coefficient $\beta$ is mainly used for following a steady timing change of an input signal.

The adder 727 adds data stored in the memory 728 (a value of the last frame) to the output of the adder 726. The adder 727 stores a result of the addition in the memory 728, and at the same time, outputs the result to the rounding unit 729. The result stored in the memory 728 is maintained until a process of the next frame, and is used for the addition in the adder 727 for the process of the next frame. The rounding unit 729 converts the output of the adder 727 into an integer value, and outputs the integer value to the FP generating unit 73.

By the process of the FP-control-position calculating unit 72 described above, a point of a frame pulse to be output for the next frame can be obtained based on the timing-error signal generated by the delay-profile detecting unit 71.

Figure 6:
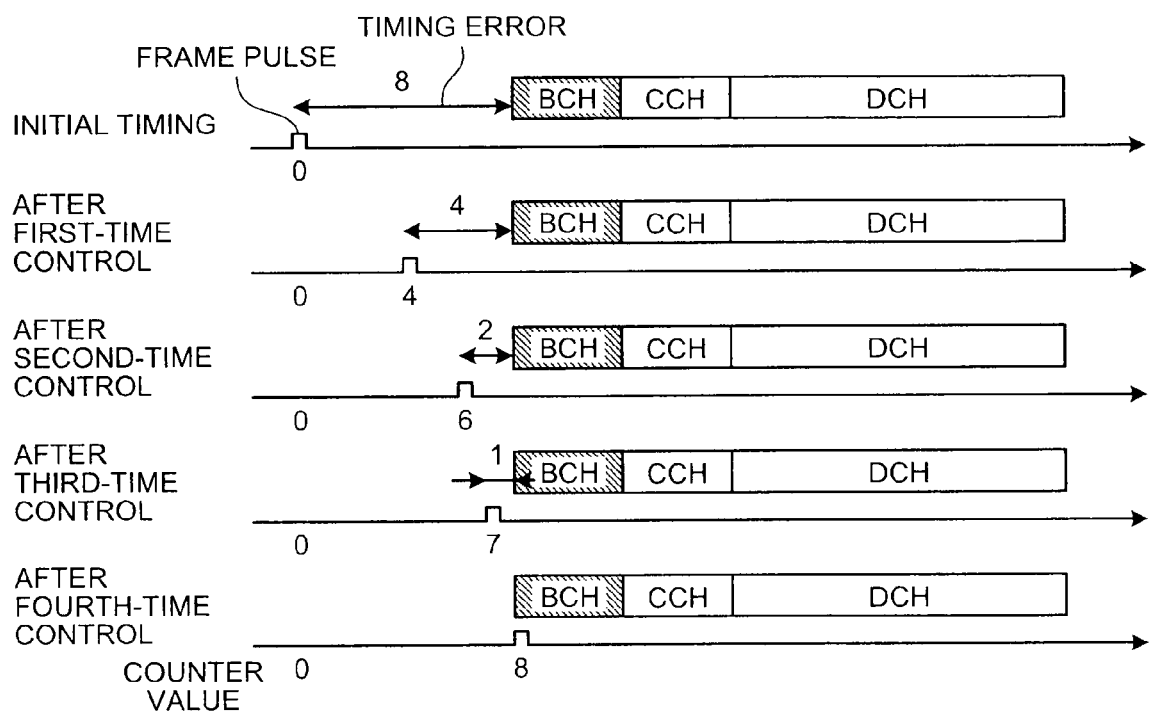
FIG. 6 is a schematic diagram illustrating an example of a control by the FP-control-position calculating unit.
Figure 7:
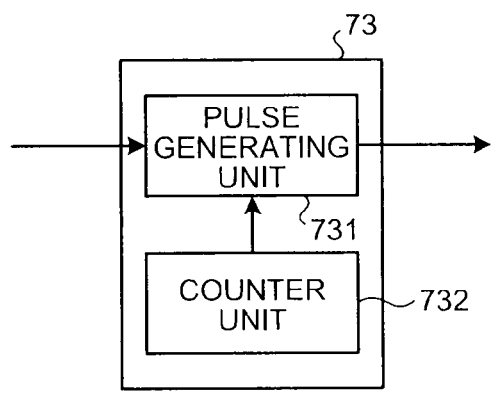
FIG. 7 is a functional block diagram of an FP generating unit shown in FIG. 1.

FIG. 6 is a schematic diagram illustrating an example of controlling a frame pulse at a frame head position (a right position) by the FP-control-position calculating unit 72; and FIG. 7 is a functional block diagram of the FP generating unit 73. As shown in FIG. 7, the FP generating unit 73 includes a pulse generating unit 731 and a counter unit 732. The counter unit 732 is an up counter that counts up at every predetermined time (clock) in the frame cycle. For example, if the frame length is 1000 clocks, it counts like 0, 1, . . . , 999, 0, 1, . . . . The timing of generating the frame pulse is designated by the counter value. Because one frame is taken as one cycle, the counter value returns to "0" for every frame. The pulse generating unit 731 generates and outputs a frame pulse at a timing in which the counter value matches with the output of the FP-control-position calculating unit 72. In other words, the FP-control-position calculating unit 72 designates a position of the frame pulse generated by the pulse generating unit 731 with the counter value. For this reason, the rounding unit 729 performs a rounding such that the real-numbered value becomes an integer value indicating the counter value.

In FIG. 6, the horizontal axis represents the counter value. For simplicity, an intermediate result such as a timing error that is actually calculated by time is indicated by converting it into the counter value. In this case, the initial counter value before performing a calculation by the FP-control-position calculating unit 72 is set to "0". Furthermore, it is considered that the frame head position (right position) is a position of the counter value "8". In addition, for simplicity, both the offset value and the value $\beta$ in the FP-control-position calculating unit 72 are set to "0", and the value $\alpha$ is set to "0.5". The memories 725 and 728 are considered to be initialized to "0".

Because the timing error is the amount of 8 counter value in this example, a time corresponding to the 8 counter value is input to the FP-control-position calculating unit 72 by a process of the delay-profile detecting unit 71. Because the offset value is "0", the timing error of the 8 counter value is input to the multiplier 722 as it is, and by multiplying it by $\alpha=0.5$, the counter value of $8 \times 0.5 = 4$ is the result of the multiplication. Because $\beta=0$ and the initial value of the memory 725 is "0", the results of calculations at the multiplier 723 and the adder 724 will be constantly "0". Therefore, the value added at the adder 726 is only the output of the multiplier 722. The adder 727, because the initial value of the memory 728 is "0", outputs the 4 counter value, which is the result of the multiplication at the multiplier 722, to the rounding unit 729 as the result of calculation, and stores the 4 counter value in the memory 728. The rounding unit 729 outputs the counter value "4". As a result, as indicated by "after first-time control" shown in FIG. 6, the FP generating unit 73 generates the frame pulse at a position of the counter value "4".

In a process of the next frame, because the difference between the position of the frame pulse and the frame head position (right position) is 4 counter value, a time corresponding to the 4 counter value is input to the FP-control-position calculating unit 72 by a process of the delay-profile detecting unit 71. The timing error of the 4 counter value is input to the multiplier 722 as it is, and by multiplying it by $\alpha=0.5$, the counter value of $4 \times 0.5 = 2$ is the result of the multiplication. The adder 727 adds the 4 counter value stored in the memory 728 to the 2 counter value, obtains 6 counter value as a result of addition, outputs it to the rounding unit 729, and at the same time, stores it in the memory 728. The rounding unit 729 outputs the counter value "6". As a result, as indicated by "after second-time control" shown in FIG. 6, the FP generating unit 73 generates the frame pulse at a position of the counter value "6".

Furthermore, in a process of the next frame, because the difference between the position of the frame pulse and the frame head position (right position) is 2 counter value, a time corresponding to the 2 counter value is input to the FP-control-position calculating unit 72 by a process of the delay-profile detecting unit 71. The timing error of the 2 counter value is input to the multiplier 722 as it is, and by multiplying it by $\alpha=0.5$, the counter value of $2 \times 0.5 = 1$ is the result of the multiplication. The adder 727 adds the 6 counter value stored in the memory 728 to the 1 counter value, obtains 7 counter value as a result of addition, outputs it to the rounding unit 729, and at the same time, stores it in the memory 728. The rounding unit 729 outputs the counter value "7". As a result, as indicated by "after third-time control" shown in FIG. 6, the FP generating unit 73 generates the frame pulse at a position of the counter value "7".

Moreover, in a process of the next frame, because the difference between the position of the frame pulse and the frame head position (right position) is 1 counter value, a time corresponding to the 1 counter value is input to the FP-control-position calculating unit 72 by a process of the delay-profile detecting unit 71. The timing error of the 1 counter value is input to the multiplier 722 as it is, and by multiplying it by α=0.5, the counter value of 1×0.5=0.5 is the result of the multiplication. The adder 727 adds the 7 counter value stored in the memory 728 to the 0.5 counter value, obtains 7.5 counter value as a result of addition, outputs it to the rounding unit 729, and at the same time, stores it in the memory 728. The rounding unit 729 rounds off "7.5" to "8" and outputs the counter value "8". As a result, as indicated by "after fourth-time control" shown in FIG. 6, the FP generating unit 73 generates the frame pulse at a position of the counter value "8".

In this manner, if an operation of calculating a frame-pulse control position and updating the timing of generating the frame pulse is repeated for every frame, i.e., every time the BCH is received, the frame synchronization can be maintained even when the difference between the timing of generating the frame pulse and the frame head position (right position) is fluctuated due to a noise or a temperature fluctuation.

Returning to FIG. 5, an explanation will be given for the offset value of the adder 721. The offset value is added to at the adder 721 in order to shift the frame pulse position by the offset value by offsetting the output of the delay-profile detecting unit 71. With this function, when an adjustment of the frame pulse position is necessary, the frame pulse can be output at an appropriate position.

Figure 8:
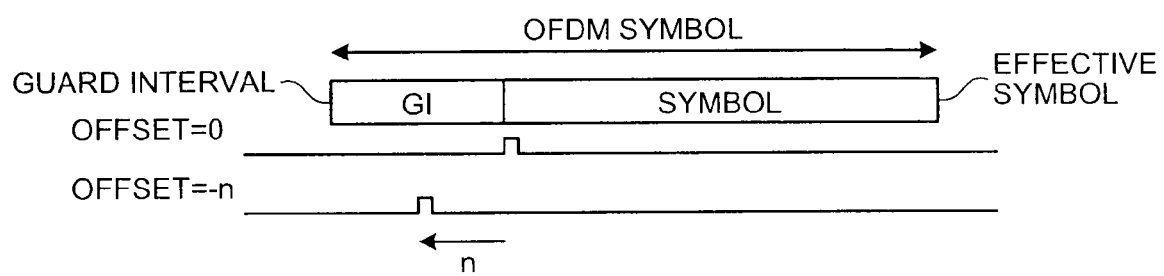
FIG. 8 is a diagram showing a relation between a guard interval and a frame-pulse offset.

For example, with this function, the frame pulse position can be set to the center of a guard interval, and when there is a jitter in the timing of generating the frame pulse or when there is a jitter in the timing of receiving the reception signal, the jitter is absorbed in the guard interval so that demodulated data without having a degradation can be obtained. FIG. 8 is a diagram showing a relation between the guard interval and the frame-pulse offset. FIG. 8 shows an example in which the position of generating the frame pulse is set to the center of the guard interval by setting the offset to −n counter value. The frame pulse position is not limited to the center of the guard interval, but can be set to any other position within the guard interval, such as a three quarter point from the start position of the guard interval. In this case, because the range of absorbing the jitter becomes narrow compared to the case of setting it at the center, this setting is more appropriate in a system having a longer delayed wave. In this manner, the offset value can be set to an appropriate value according to a system to which the present invention is applied.

In order to determined a timing of the counter value "0" (corresponding to the initial timing shown at the top of FIG. 6), for example, a process generally called an initial synchronization is used. The initial synchronization is a process for detecting a rough timing of a frame, and can be performed by a common method. For example, the initial synchronization is performed by a correlation process for a known pattern included in the BCH.

As described above, in the first embodiment, a compensation of a clock-frequency deviation is performed before the FFT independently of a frame synchronization process by the clock-frequency-deviation detecting unit 5 and the clock-frequency-deviation compensating unit 4, while TG 7 performs the frame synchronization process for a signal of which the clock-frequency deviation is compensated. As a result, even if there is a large clock-frequency deviation, the frame synchronization process can be performed in an accurate manner.

Figure 9:
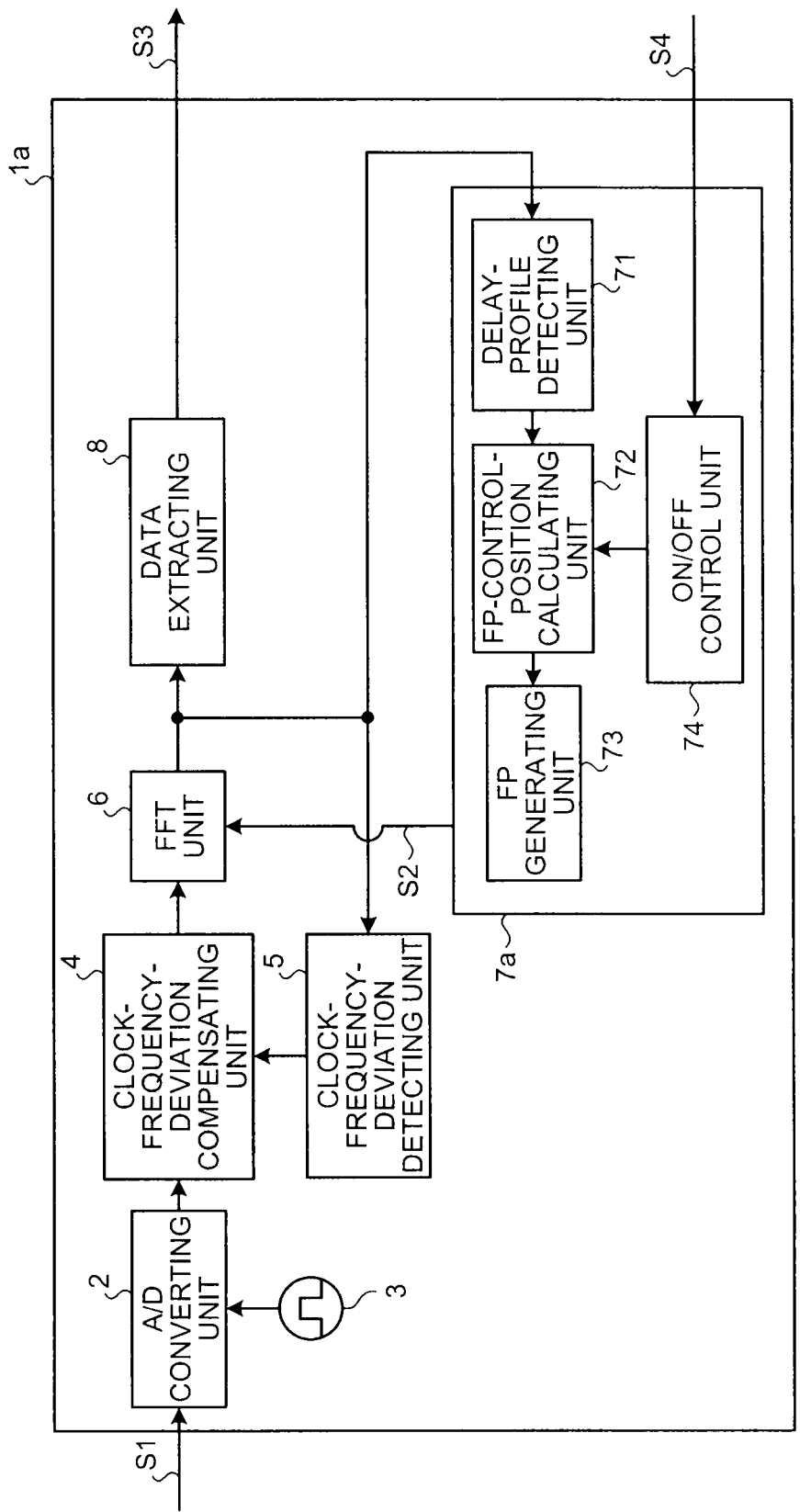
FIG. 9 is a functional block diagram of a demodulator according to a second embodiment of the present invention.

FIG. 9 is a functional block diagram of a demodulator 1a according to a second embodiment of the present invention. In the second embodiment, the TG 7 of the demodulator 1 according to the first embodiment is replaced by a TG 7a in the demodulator 1a, and other than that, the configuration is the same as that of the demodulator 1. The TG 7a is constructed by adding an ON/OFF control unit 74 that controls ON/OFF of the FP-control-position calculating unit 72 based on an ON/OFF signal from the outside to the TG 7 according to the first embodiment. Other than that, the configuration of the TG 7a is the same as that of the TG 7. The constituent elements same as those of the first embodiment are assigned with same reference numerals and explanations thereof will be omitted.

FIGS. 10A and 10B are schematic diagrams for explaining an ON/OFF signal S4. In FIGS. 10A and 10B, the BCH is represented by B, the CCH is represented by C, and the DCH is represented by D. As shown in FIGS. 10A and 10B, the ON/OFF signal S4 is a signal indicating whether the BCH can be received or not. FIG. 10A shows a case in which a frame without including the BCH is transmitted. Because the BCH is a channel that does not transmit user data, when it is desired to transmit more user data, the BCH may not be transmitted in the whole frame, but intermittently transmitted. As shown in FIG. 10A, the ON/OFF signal S4 becomes ON during a reception of a frame including the BCH; however, the ON/OFF signal S4 becomes OFF during a reception of a frame that does not include the BCH because the BCH cannot be received.

FIG. 10B shows a case in which a frame is missed. When a frequency is shared with other system, there is a case in which a free time is created for the other system, and as shown in FIG. 10B, a frame may be missed. In this case, the ON/OFF signal S4 becomes OFF when the frame is missed. If a frame synchronization process is performed when a BCH used for a frame synchronization is not received, a correct control cannot be performed, resulting in a degradation of an accuracy of the frame synchronization. Therefore, as shown in FIGS. 10A and 10B, when the BCH cannot be received, the ON/OFF signal S4 is set to OFF in the second embodiment.

Because a timing at which the BCH is not received is generally known, the information thereof can be input as the ON/OFF signal S4. The ON/OFF control unit 74 disables the operation of the FP-control-position calculating unit 72 when the ON/OFF signal S4 is OFF, and enables the operation of the FP-control-position calculating unit 72 when the ON/OFF signal S4 is ON. The other operations in the second embodiment are the same as those in the first embodiment.

As described above, the ON/OFF control unit 74 disables the operation of the FP-control-position calculating unit 72 when the BCH is not received, based on the ON/OFF signal S4 that indicates whether the BCH is received or not. Therefore, even when the BCH is not received, the frame synchronization can be performed in an accurate manner.

Figure 11:
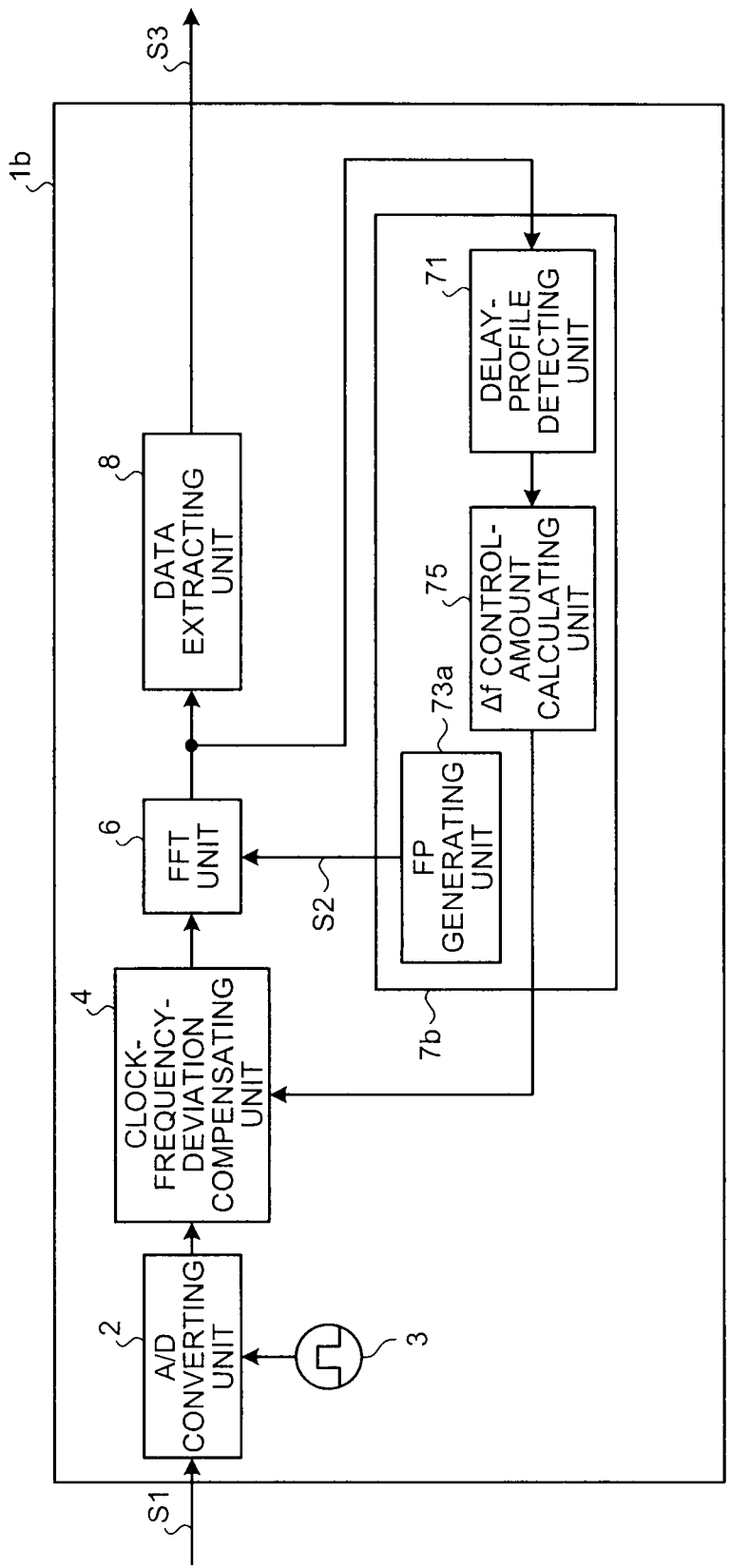
FIG. 11 is a functional block diagram of a demodulator according to a third embodiment of the present invention.

FIG. 11 is a functional block diagram of a demodulator 1b according to a third embodiment of the present invention. The demodulator 1b according to the third embodiment is configured such that the clock-frequency-deviation detecting unit 5 is removed from the demodulator 1 according to the first embodiment and the TG 7 of the demodulator 1 is replaced by a TG 7b, and other than that, the configuration is the same as that of the demodulator 1. The TG 7b includes an FP generating unit 73a and a Δf control-amount calculating unit 75 instead of the FP generating unit 73 and the FP-control-position calculating unit 72. Other than that, the configuration of the TG 7b is the same as that of the TG 7. The constituent elements same as those of the first embodiment are assigned with same reference numerals and explanations thereof will be omitted.

Figure 12:
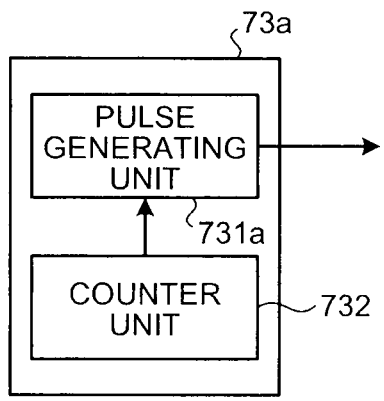
FIG. 12 is a functional block diagram of an FP generating unit shown in FIG. 11.

FIG. 12 is a functional block diagram of the FP generating unit 73a. The FP generating unit 73a includes a pulse generating unit 731a and the counter unit 732. Unlike the first embodiment, the pulse generating unit 731a of the FP generating unit 73a according to the third embodiment generates a frame pulse at the same counter value constantly based on an output from the counter unit 732 without an input from the FP-control-position calculating unit 72. Other than that, the FP generating unit 73a is the same as the FP generating unit 73 according to the first embodiment, and the counter unit 732 is the same as the counter unit 732 according to the first embodiment.

Figure 13:
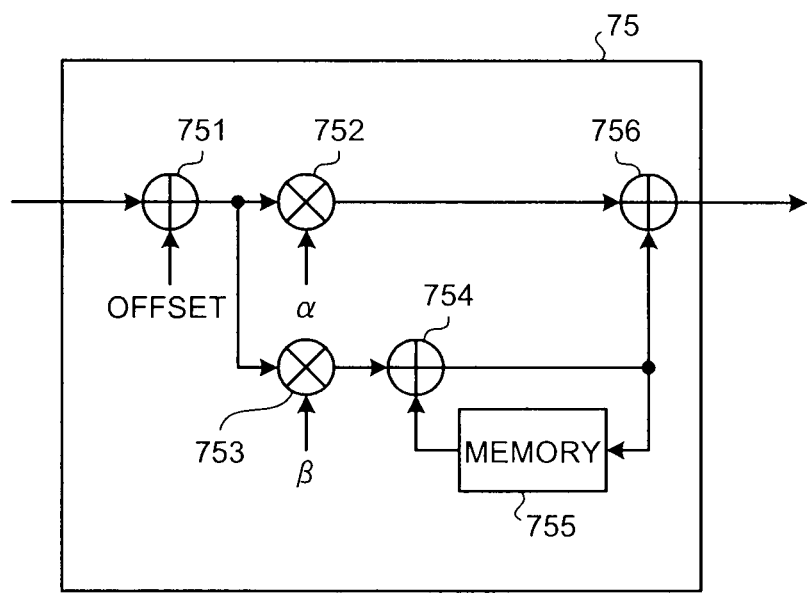
FIG. 13 is a functional block diagram of a Δf control-amount calculating unit shown in FIG. 11.

FIG. 13 is a functional block diagram of the Δf control-amount calculating unit 75. In the first embodiment, the frame synchronization is performed by changing the counter value for generating the frame pulse; however, in the third embodiment, the counter value is fixed, and the frame synchronization is performed by the Δf control-amount calculating unit 75 obtaining the clock-frequency control amount based on the timing error signal output from the delay-profile detecting unit 71 and controlling the clock frequency based on the obtained control amount. As shown in FIG. 13, the Δf control-amount calculating unit 75 includes an adder 751, a multiplier 752, a multiplier 753, an adder 754, a memory 755, and an adder 756.

An operation of the Δf control-amount calculating unit 75 according to the third embodiment will be explained. The adder 751 adds an offset value to a timing-error signal input from the delay-profile detecting unit 71. The adder 751 outputs a result of adding the offset value to the multiplier 752 and the multiplier 753. The multiplier 752 multiplies the output of the adder 751 by a coefficient α and outputs a result of the multiplication to the adder 756, and the multiplier 753 multiplies the output of the adder 751 by a coefficient β and outputs a result of the multiplication to the adder 754. Details of the offset value, α, and β are the same as those in the first embodiment. The adder 754 adds data stored in the memory 755 (a result of an addition for the last frame) to the result of the multiplication output from the multiplier 753. Then, the adder 754 stores a result of the addition in the memory 755, and at the same time, outputs the result to the adder 756. The result stored in the memory 755 is maintained until a process of the next frame, and is used for the addition in the adder 754 for the process of the next frame. The adder 756 adds the output of the addition of the adder 754 to the output of the multiplication of the multiplier 752, and outputs a result of the addition to the clock-frequency-deviation compensating unit 4.

The operation of the Δf control-amount calculating unit 75 is the same as the operation of the FP-control-position calculating unit 72 from which the operations of the adder 727, the memory 728, and the rounding unit 729 are removed. Unlike the first embodiment, because the process result of the last frame is not added and the rounding is not performed in the Δf control-amount calculating unit 75, the timing error signal is output through the second-order loop control system.

For example, when the position of generating the frame pulse is ahead of the frame head position (correct position), the timing error signal output to the delay-profile detecting unit 71 is a positive value as shown in FIG. 4A, and when the frame pulse position is behind the correct timing, the timing error signal is a negative value as shown in FIG. 4B. The Δf control-amount calculating unit 75 outputs the timing error signal as a value passed the second-order loop control system (timing compensation amount). When the timing compensation amount is a positive value, the clock-frequency-deviation compensating unit 4 performs a compensation such that the clock frequency is lowered based on the positive value. When the clock frequency is lowered, the frame pulse position is output with a time delay (shifted backwards in time), and the timing error is relieved. By repeating the compensation, the timing error converges to zero. On the other hand, when the timing error is a negative value, the clock-frequency-deviation compensating unit 4 performs a compensation such that the clock frequency is increased. When the clock frequency is increases, the frame pulse position is output ahead in time (shifted forwards in time. By repeating the compensation, the timing error converges to zero.

In this manner, in the third embodiment, the frame pulse position can be equivalently controlled by controlling the clock frequency although the FP generating unit 73a constantly outputs the same counter value, and as a result, the frame synchronization can be taken. This is an operation to match the timing (i.e., the phase) by controlling the clock frequency, and in principle, is and operation equivalent to a phase locked loop (PLL).

For this reason, because the operation of the third embodiment is the same as the operation of the PLL, there is a constraint on the capture range of the PLL. In other words, although both the phase (timing) and the frequency can be synchronized at the same time in the third embodiment, as described above, there is a constraint on the frequency capture range. Therefore, when the frame length is long, the frame synchronization may not be taken due to the constraint. However, because the frame length is known and the maximum value of the clock-frequency deviation can be roughly estimated, the present invention can be applied with no problem if the clock-frequency deviation is within a range of the constraint.

As described above, in the third embodiment, a frame synchronization process is performed on a signal of which a clock-frequency deviation is compensated by integrating a compensation of the clock-frequency deviation and the frame synchronization process and compensating the clock-frequency deviation before the FFT. For this reason, the clock-frequency-deviation detecting unit 5 is not necessary, and as a result, a large clock-frequency deviation can be compensated with a circuit size smaller than that of the first embodiment.

Figure 14:
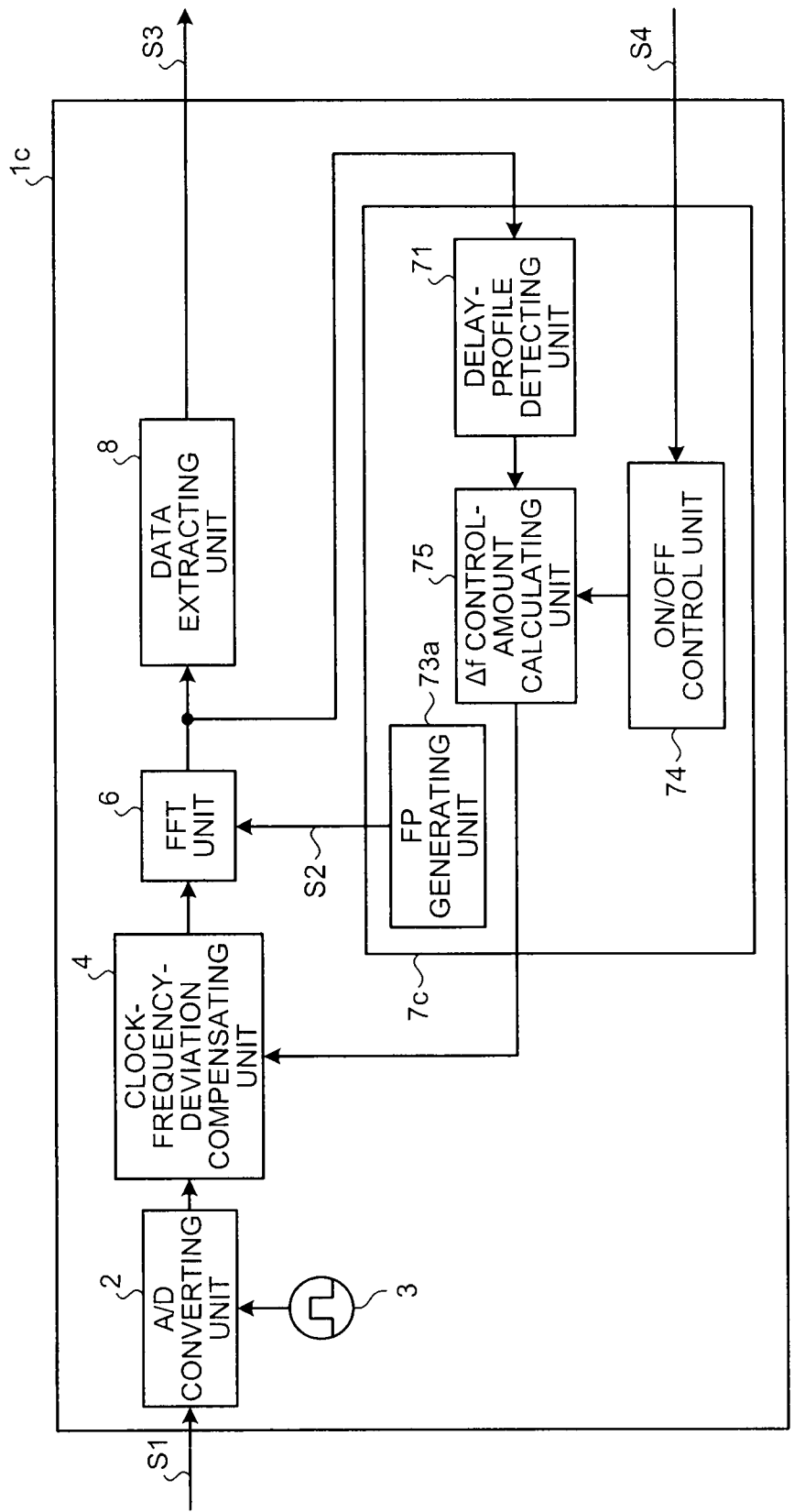
FIG. 14 is a functional block diagram of a demodulator according to a fourth embodiment of the present invention.

FIG. 14 is a functional block diagram of a demodulator 1c according to a fourth embodiment of the present invention. The demodulator 1c according to the fourth embodiment is configured such that the TG 7b of the demodulator 1b according to the third embodiment is replaced by a TG 7c, and other than that, the configuration is the same as that of the demodulator 1b. The TG 7c includes the ON/OFF control unit 74 that controls ON/OFF of the Δf control-amount calculating unit 75 based on an ON/OFF signal S4. Other than that, the configuration of the TG 7c is the same as that of the TG 7b according to the third embodiment. The ON/OFF control unit 74 is the same as the ON/OFF control unit 74 according to the second embodiment except that a transmission destination of the ON/OFF signal is the Δf control-amount calculating unit 75 instead of the FP-control-position calculating unit 72. The constituent elements same as those of the second and third embodiments are assigned with same reference numerals and explanations thereof will be omitted.

In the fourth embodiment, similar to the second embodiment, the ON/OFF control of the operation of the frame synchronization is performed based on a signal (the ON/OFF signal S4) that indicates whether the BCH input from the outside can be received or not. The definition of the ON/OFF signal S4 is the same as that in the second embodiment. In the fourth embodiment, the Δf control-amount calculating unit 75 operates when the ON/OFF signal S4 is ON, and stops its operation when the ON/OFF signal S4 is OFF. The other operations are the same as those in the third embodiment.

As described above, in the fourth embodiment, the ON/OFF control unit 74 is included in the configuration of the third embodiment. The ON/OFF control unit 74 disables the operation of the Δf control-amount calculating unit 75 when the BCH is not received, based on the ON/OFF signal S4 that indicates whether the BCH is received or not. Therefore, even when the BCH is not received, the frame synchronization can be performed in an accurate manner.

According to one aspect of the present invention, even when a large clock-frequency deviation exists, a frame synchronization can be performed in an accurate manner.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A frame synchronization method in a demodulator that performs an orthogonal frequency division multiplexing demodulation, the frame synchronization method comprising:
    obtaining a clock-frequency deviation based on a synchronization signal for taking a frame synchronization included in a reception signal;
    generating a frame pulse that indicates a head of a frame at a fixed position;
    compensating a clock-frequency deviation of the reception signal in a former stage of a fast Fourier transform;
    performing the fast Fourier transform on the reception signal that has been compensated at the compensating with the frame pulse position as a frame head position;
    providing the reception signal on which the fast Fourier transform has been performed directly to the obtaining of the clock-frequency-deviation; and
    demodulating the reception signal on which the fast Fourier transform has been performed.

2. A demodulator that performs an orthogonal frequency division multiplexing demodulation, the demodulator comprising:
    a clock-frequency-deviation detecting unit that detects a clock-frequency deviation based on a synchronization signal for taking a frame synchronization included in a reception signal;
    a clock-frequency-deviation compensating unit that compensates a clock-frequency deviation of the reception signal in a former stage of a fast Fourier transform unit; and
    a timing control unit that controls a frame pulse position that indicates a head of a frame, based on the synchronization signal, wherein
    the fast Fourier transform unit
        performs a fast Fourier transform on the reception signal that has been compensated by the clock-frequency-deviation compensating unit with the frame pulse position as a frame head position, and
        provides the reception signal on which the fast Fourier transform has been performed directly to the clock-frequency-deviation detecting unit; and
    a demodulating unit that demodulates the reception signal on which the fast Fourier transform has been performed.

3. The demodulator according to claim 2, wherein the timing control unit detects an error of the frame pulse position based on a channel estimation value estimated using the synchronization signal on which the fast Fourier transform has been performed, and controls the frame pulse position based on detected error.

4. The demodulator according to claim 3, wherein the timing control unit generates a delay profile based on a result of performing an inverse fast Fourier transform on the channel estimation value, and detects the error based on generated delay profile.

5. The demodulator according to claim 3, wherein the timing control unit controls the frame pulse position by using first-order loop and second-order loop feedback controls based on the detected error.

6. The demodulator according to claim 3, wherein the timing control unit adds a predetermined offset value to the detected error, and controls the frame pulse position based on an error obtained by adding the offset value.

7. The demodulator according to claim 2, wherein the timing control unit performs its control for every frame.

8. The demodulator according to claim 2, wherein the timing control unit stops its control, based on a control signal that indicates whether the synchronization signal is received or not, when the control signal indicates that the synchronization signal is not received.

9. A demodulator that performs an orthogonal frequency division multiplexing demodulation, the demodulator comprising:
    a timing control unit that obtains a clock-frequency deviation based on a synchronization signal for taking a frame synchronization included in a reception signal, and generates a frame pulse that indicates a head of a frame at a fixed position;
    a clock-frequency-deviation compensating unit that compensates a clock-frequency deviation of the reception signal in a former stage of a fast Fourier transform unit, wherein
    the fast Fourier transform unit
        performs a fast Fourier transform on the reception signal that has been compensated by the clock-frequency-deviation compensating unit with the frame pulse position as a frame head position, and
        provides the reception signal on which the fast Fourier transform has been performed directly to the timing control unit; and
    a demodulating unit demodulates the reception signal on which the fast Fourier transform has been performed.

10. The demodulator according to claim 9, wherein the timing control unit detects an error of a clock frequency based on a channel estimation value estimated using the synchronization signal on which the fast Fourier transform has been performed, and obtains the clock-frequency deviation based on detected error.

11. The demodulator according to claim 10, wherein the timing control unit generates a delay profile based on a result of performing an inverse fast Fourier transform on the channel estimation value, and detects the error based on generated delay profile.

12. The demodulator according to claim 10, wherein the timing control unit obtains the clock-frequency deviation by using first-order loop and second-order loop feedback controls based on the detected error.

13. The demodulator according to claim 10, wherein the timing control unit adds a predetermined offset value to the detected error, and obtains the clock-frequency deviation based on an error obtained by adding the offset value.

14. The demodulator according to claim 9, wherein the timing control unit performs its control for every frame.

15. The demodulator according to claim 9, wherein the timing control unit stops its control, based on a control signal that indicates whether the synchronization signal is received or not, when the control signal indicates that the synchronization signal is not received.

16. A frame synchronization method in a demodulator that performs an orthogonal frequency division multiplexing demodulation, the frame synchronization method comprising:

detecting a clock-frequency deviation based on a synchronization signal for taking a frame synchronization included in a reception signal;

compensating a clock-frequency deviation of the reception signal in a former stage of a fast Fourier transform; and controlling a frame pulse position that indicates a head of a frame, based on the synchronization signal, wherein the frame synchronization method further includes performing the fast Fourier transform on the reception signal that has been compensated at the compensating with the frame pulse position as a frame head position;

providing the reception signal on which the fast Fourier transform has been performed directly to the detecting of the clock-frequency-deviation; and demodulating the reception signal on which the fast Fourier transform has been performed.

* * * * *